US008532437B2

(12) United States Patent
Christiansen

(10) Patent No.: US 8,532,437 B2
(45) Date of Patent: Sep. 10, 2013

(54) SYSTEMS AND METHODS FOR BLOCK RECOMPOSITION FOR COMPOUND IMAGE COMPRESSION

(75) Inventor: Bernd Oliver Christiansen, Santa Barbara, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 586 days.

(21) Appl. No.: 12/467,782

(22) Filed: May 18, 2009

(65) Prior Publication Data
US 2010/0290704 A1 Nov. 18, 2010

(51) Int. Cl.
*G06F 9/54* (2006.01)
(52) U.S. Cl.
USPC ........... 382/302; 345/426; 382/173; 382/176; 382/195; 382/232; 382/239; 382/240; 382/243; 382/248

(58) Field of Classification Search
None
See application file for complete search history.

(56) References Cited

U.S. PATENT DOCUMENTS

| | | | | |
|---|---|---|---|---|
| 5,168,532 A * | 12/1992 | Seppi et al. | | 382/270 |
| 5,576,548 A * | 11/1996 | Clarke et al. | | 250/369 |
| 5,631,982 A * | 5/1997 | Inselberg et al. | | 382/281 |
| 5,933,540 A * | 8/1999 | Lakshminarayanan et al. | | 382/260 |
| 6,324,305 B1 * | 11/2001 | Holladay et al. | | 382/239 |
| 6,941,024 B2 * | 9/2005 | Mukherjee | | 382/248 |
| 6,975,742 B2 * | 12/2005 | Cheng | | 382/243 |
| 6,990,252 B2 * | 1/2006 | Shekter | | 382/276 |
| 7,027,647 B2 * | 4/2006 | Mukherjee et al. | | 382/173 |
| 7,043,079 B2 | 5/2006 | Malvar et al. | | 382/195 |
| 7,139,433 B2 * | 11/2006 | Li | | 382/232 |
| 7,321,674 B2 * | 1/2008 | Vuylsteke | | 382/128 |
| 7,397,952 B2 * | 7/2008 | Malvar et al. | | 382/195 |
| 2002/0034337 A1 * | 3/2002 | Shekter | | 382/275 |
| 2002/0064313 A1 * | 5/2002 | Cheng | | 382/239 |
| 2003/0048954 A1 * | 3/2003 | Matthews | | 382/240 |
| 2003/0082503 A1 * | 5/2003 | Suzuki et al. | | 434/118 |
| 2003/0123729 A1 * | 7/2003 | Mukherjee et al. | | 382/176 |
| 2003/0133617 A1 * | 7/2003 | Mukherjee | | 382/239 |
| 2003/0185454 A1 * | 10/2003 | Simard et al. | | 382/240 |
| 2003/0214296 A1 * | 11/2003 | Carlini et al. | | 324/309 |

(Continued)

FOREIGN PATENT DOCUMENTS

WO  WO/2005106784 A1  11/2005

OTHER PUBLICATIONS

De Queiroz, Ricardo L., "On Data Filling Algorithms for MRC Layers", Image Processing 2000. Processingm, 2000 International Conference on Sep. 10-13, 2000, IEEE, Piscatawaay NJ, USA, Sep. 10, 2000, vol. 2, pp. 586-589, 4 pgs.

(Continued)

*Primary Examiner* — Tsung-Yin Tsai
(74) *Attorney, Agent, or Firm* — McDermott Will & Emery LLP

(57) ABSTRACT

A new approach is proposed that contemplates systems and methods to support block-based compression of a compound image by skipping "don't care" blocks in the layers of the image while neither introducing significant overhead nor requiring changes to the compression method used. The block-based compression approach first segments a compound image into multiple layers and then recomposes a new set of image layers, possibly with new dimensions, from only the non-"don't care" blocks in the layers of the original image. The approach may later decompress the compressed image layers and restore the image by copying the decompressed blocks to their respective positions in the original image.

30 Claims, 7 Drawing Sheets

(56) References Cited

U.S. PATENT DOCUMENTS

| | | | |
|---|---|---|---|
| 2004/0114789 A1* | 6/2004 | Saha et al. | 382/128 |
| 2004/0167387 A1* | 8/2004 | Wollenweber et al. | 600/407 |
| 2004/0179742 A1* | 9/2004 | Li | 382/239 |
| 2004/0223636 A1* | 11/2004 | Edic et al. | 382/131 |
| 2004/0227758 A1* | 11/2004 | Curry et al. | 345/426 |
| 2005/0008115 A1* | 1/2005 | Tsukagoshi | 378/4 |
| 2005/0180647 A1* | 8/2005 | Curry et al. | 382/243 |
| 2005/0180648 A1* | 8/2005 | Curry et al. | 382/243 |
| 2005/0190878 A1* | 9/2005 | De Man et al. | 378/9 |
| 2005/0281474 A1* | 12/2005 | Huang | 382/239 |
| 2006/0029285 A1* | 2/2006 | Hein et al. | 382/260 |
| 2006/0045357 A1* | 3/2006 | Schwartz et al. | 382/232 |
| 2006/0269151 A1* | 11/2006 | Sakuyama | 382/232 |
| 2006/0277520 A1* | 12/2006 | Gennari | 716/21 |
| 2007/0189615 A1* | 8/2007 | Liu et al. | 382/232 |
| 2008/0050023 A1* | 2/2008 | Feng et al. | 382/232 |
| 2008/0144952 A1* | 6/2008 | Chen et al. | 382/239 |

OTHER PUBLICATIONS

Simard, Patrice et al., "A Wavelet Coder for Masked Images", 20010327; 20010327-20010329, Mar. 27, 2001, pp. 93-102, 10 pgs.

Mixed Raster Content (MRC) model (Mixed Raster Content Model for Compound Image Compression, Ricardo de Queiroz, Robert Buckley and Ming Xu, Corporate Research & Technology, Xerox Corp. Proc. SPIE 3653, Visual Communications and Processing '99, 1106 (Dec. 28, 1998); doi:10.1117/12.334618.

Compound Image Compression for Real-Time Computer Screen Image Transmission, IEEE Transactions on Image Processing, vol. 14, No. 8, pp. 993-1005, Aug. 2005; T. Lin and P. Hao.

JPEG-Matched MRC Compression of Compound Documents, in ICIP '01, pp. 434-437, 2001; D. Mukherjee, N. Memon, and A. Said.

Lossless Compression of Layered Documents: how to Set the "Don't Care" pixels, Anna Ansalone and Bruno Capentieri, Proceedings of the 5$^{th}$ WSEAS Int. Conf. on Data Networks, Communications & Computers, Bucharest, Romania, Oct. 16-17, 2006.

* cited by examiner

| 1 | 2 | 3 | 4 | 5 | 6 | 7 | 8 |
|---|---|---|---|---|---|---|---|
| 9 | 10 | 11 | 12 | 13 | 14 | 15 | 16 |
| 17 | 18 | 19 | 20 | 21 | 22 | 23 | 24 |
| 25 | 26 | 27 | 28 | 29 | 30 | 31 | 32 |
| 33 | 34 | 35 | 36 | 37 | 38 | 39 | 40 |
| 41 | 42 | 43 | 44 | 45 | 46 | 47 | 48 |

FIG. 3(c)

| 1 | 2 | 3 | 4 | 5 |
|---|---|---|---|---|
| 6 | 7 | 8 | 9 | 12 |
| 13 | 14 | 15 | 16 | 20 |
| 21 | 22 | 23 | 24 | 28 ← 308 |
| 29 | 30 | 31 | 32 | 33 |
| 34 | 35 | 36 | 37 | 38 |
| 39 | 40 | 41 | 42 | 43 |
| 44 | 45 | 46 | 47 | 48 |

SYSTEMS AND METHODS FOR BLOCK RECOMPOSITION FOR COMPOUND IMAGE COMPRESSION

BACKGROUND

A compound image is an image that depicts multiple types of content with completely different characteristics. For a non-limiting example, a screenshot may contain textual images (such as simple text) rendered on solid background as well as continuous-tone images. Since the characteristics of textual images and continuous-tone images are substantially different—textual images typically have very few colors with sharp edges separating pixels of different colors, whereas continuous-tone images tend to have a large number of colors with smooth transitions between neighboring pixels, it is very difficult to design a single compression approach that works well for compound images.

One way to address the challenge of compressing compound images is to adopt the Mixed Raster Content (MRC) model, which segments a compound image into multiple layers and compresses each of the multiple layers with a separate compressor. For a non-limiting example, a screenshot can be segmented into a layer containing text and simple graphics as well as a layer containing continuous-tone images. Since MRC distributes the pixels of an image across multiple layers, each layer typically contains "don't care" pixels (or holes) whose values are determined by other layers. Some compression methods segment an image into blocks of pixels and operate on these blocks. A block of pixels in any layer of an image may contain "don't care" pixels only and, therefore, is not required for the reconstruction of the image from the individual layers. Such a block is referred to hereinafter as a "don't care" block. If a block contains at least one non-"don't care" pixel, it is not a "don't care" block. For the efficient compression of a compound image, where a layer of the image to be compressed contains "don't care" pixels and blocks, it is important to reduce or eliminate overhead in the compressed byte stream caused by unnecessary operation on the "don't care" blocks in the layers. In certain applications, it is also important to enable the compression of the compound image in web-based execution environments without altering the actual compressor(s) being used.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

FIGS. 3(a)-(e) illustrate an example of block-based recomposition of a compound image in accordance with FIG. 1 and FIG. 2.

DETAILED DESCRIPTION OF EMBODIMENTS

The approach is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

A new approach is proposed that contemplates systems and methods to support block-based compression of a compound image by skipping "don't care" blocks in the layers of the image while neither introducing significant overhead nor requiring changes to the compression method used. More specifically, the block-based compression approach first segments a compound image into multiple layers. The approach then recomposes a new set of image layers, possibly with new dimensions, from only the non-"don't care" blocks in the layers of the original image, effectively skipping the "don't care" blocks in the original image, before proceeding to compress the newly composed image. This step does not impact the dimensions or resolution of the decompressed image. The approach may later decompress the compressed image layers and restore the image by copying the decompressed blocks to their respective positions in the original image. Since such an approach does not require source code access, it works with any "off-the-shelf" compression methods and can leverage highly optimized compression functions that may already be available in the target environment, such as a JPEG decoder/compressor in the native Flash runtime environment or hardware-optimized JPEG decoders on mobile devices. In addition, such approach does not introduce any overhead in practical applications such as screen-sharing.

As used hereinafter, a (two-dimensional) image may be segmented into one or more layers, wherein each layer has M×N number of blocks measuring M blocks in x-dimension and N blocks in y-dimension, respectively, wherein each block is of the size of L×L pixels. Thus, each layer in the image has M×L pixels in x-dimension and N×L pixels in y-dimension with a total of M×N×L×L pixels.

Figure 1:
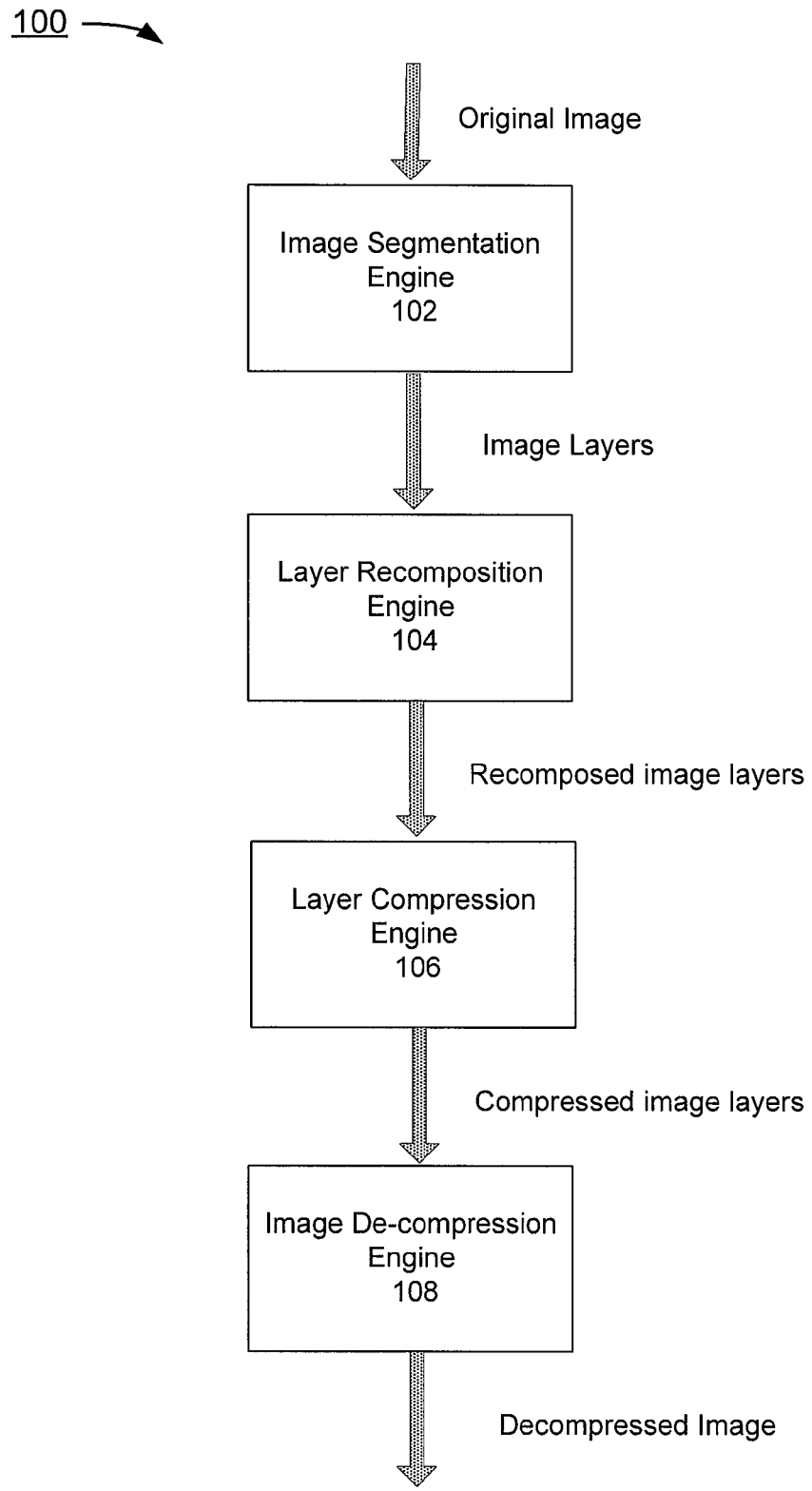
FIG. 1 depicts an example of a diagram of system to support block-based recomposition of compound images.

FIG. 1 depicts an example of a diagram of system to support block-based recomposition of compound images. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes one or more hosts/hosting devices (not shown) each operable to run at least one or more of an image segmentation engine 102, an layer recomposition engine 104, an layer compression engine 106, and an optional image decompression and composition engine 108. As used herein, the term "engine" or "component" refers to a software, firmware, hardware, or other component that is used to effectuate a purpose. The engine or component will typically include software instructions that are stored in non-volatile memory (also referred to as secondary memory). When the software instructions are executed, at least a subset of the software instructions is loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

In the example of FIG. 1, each of the hosts running the engines and the components can be a computing device, a communication device, a storage device, or any electronic device capable of running a software component. For non-limiting examples, a computing device can be but is not limited to, a laptop PC, a netbook PC, a desktop PC, a tablet PC, an iPod, a PDA, or a server machine. A storage device can be but is not limited to a hard disk drive, a flash memory drive, or any portable storage device. A communication device can be but is not limited to a mobile phone or a smartphone.

In the example of FIG. 1, the image segmentation engine 102 is operable to decompose or segment a compound image into a plurality of (image) layers based on, for a non-limiting example, the MRC imaging model. MRC adopts a multi-layered, multi-resolution imaging model for the compound image, wherein such model includes at least one or more color image layers to represent, for a non-limiting example, foreground and background layers of the image, and a binary image layer to be used as mask. The mask layer describes how to restore/reconstruct the image from the other two layers. More specifically, when the value of a mask layer pixel is 1, the corresponding pixel from the foreground layer is selected for the restored image; when the value of a mask layer pixel is 0, the corresponding pixel from the background layer is selected. Under this 3-layer model, the foreground layer is essentially poured through the mask layer onto the background layer. Alternatively, an extended MRC imaging model can be composed of one background layer and one or more pairs of foreground and mask layers. Given a background layer, a foreground layer is imaged onto the background layer through the mask layer to compose a new background image, and another foreground layer can be imaged onto this new background through another mask layer and the process can be repeated multiple times. Alternatively, a mask layer can be implicitly coded by defining a transparent color in one of the other layers. Alternatively, two or more binary mask layers can be combined into a single non-binary mask layer.

In the example of FIG. 1, the image segmentation engine 102 is operable to decompose and represent the compound image such as a page as one, two, three, or more layers, depending on the content of the image. For a non-limiting example, a page consisting of a picture can be represented by a background layer only; a page containing black-and-white text can use a mask layer, with the foreground and background layers defaulted to black and to white colors, respectively. For a non-limiting example, the image segmentation engine 102 may first identify a set of colors that (for the most part) represent text and simple graphics. The image segmentation engine 102 may then assign all pixels whose color is in this set to the foreground layer and all other pixels to the background layer.

In the example of FIG. 1, the layer recomposition engine 104 is operable to recompose one or more new image layers based on the decomposed original image layers with possible new dimensions and with "don't care" blocks in the original image layers identified and skipped. This step does not impact the dimensions or resolution of the decompressed image. The layer recomposition engine 104 first identifies and marks the "don't care" blocks in each of the one or more layers received, wherein each of the "don't care" blocks contains "don't care" pixels only whose value will be determined by other layers. The layer recomposition engine 104 then selects possible new dimensions for each of the one or more new image layers that hold all non-"don't care" blocks in the corresponding original image layer while minimizing overhead in the form of "unused" blocks. Given a compressor that operates on blocks of size L×L pixels each and a number N of non-"don't care" blocks in the layer:

If all non-"don't care" blocks fit into the maximum width of the compressor being used, the layer recomposition engine 104 simply arranges all non-"don't care" blocks in the layer in a single row, i.e., the layer recomposition engine 104 selects dimensions (N*L)×L;

Otherwise: the layer recomposition engine 104 computes the prime factors of $N=k_0*k_1* \ldots *k_n$, where $k_i$s are prime factors of N, and tries to select dimensions by splitting the set of prime factors into two separate sets and computing the width and height, respectively, by multiplying the prime factors in the two sets, i.e., the layer recomposition engine 104 selects dimensions $(k_{x0}*k_{x1}* \ldots *k_{xw}*L) \times (k_{y0}*k_{y1}* \ldots *k_{yh}*L)$ for the new recomposed layer with non-"don't care" blocks only.

If no valid dimensions are found in the previous step, the layer recomposition engine 104 increases N by one and repeats the previous step until it finds valid dimensions.

After determining the dimensions for each of the one or layers, the layer recomposition engine 104 recomposes each of the one or more new image layers by copying all non-"don't care" blocks in each of the original image layers, from top-to-bottom and left-to-right, into the corresponding newly composed image layer.

By recomposing the new image layers from only the non-"don't care" blocks in the layers of the original image layers, the layer recomposition engine 104 eliminates or reduces the overhead introduced by "don't care" blocks when compressing a layer with the afore-mentioned blocked-based compression approach. More specifically, no value, not even arbitrary, average, or uniform one, needs to be assigned to any of the "don't care" pixels in the "don't care" blocks for compression efficiency considerations, since these pixels and blocks will not be compressed at all. Furthermore, no separate header is needed for each of the "don't care" or non-"don't care" blocks that are to be compressed or skipped, effectively eliminating the overhead introduced by such headers during compression. In addition, since only layers of the recomposed new image that skips all "don't care" blocks are to be compressed, there is no need to modify the compressors to skip such "don't care" blocks, effectively eliminating the need to access, change, or optimize the source code of the compressors being used, which is often either straight-out impossible in some environments (e.g., AJAX running inside of a browser) or prohibitively expensive in other environments (e.g., ActionScript being executed by Adobe's Flash Player) due to slow execution speeds.

In the example of FIG. 1, the layer compression engine 106 processes and compresses each of the one or more newly created image layers with its own compressor by utilizing the degrees of freedom offered by the MRC-based decomposition process, wherein each compressor may adopt its own compression approach and compression parameters, such as image resolution or color mapping. The way the original compound image is decomposed affects the operation of the layer compression engine 106, and the compressor and resolution chosen by the layer compression engine 106 for a given layer would be matched to the layer's content type, allowing for improved compression while reducing distortion visibility. For non-limiting examples, in case of both the RC decomposition and the TI decomposition discussed above, the background layer is suitable for continuous tone image compressors such as JPEG or JPEG-2000, unless continuous tone images are not present in the original document and the document was not scanned, in which case other compressors may be more efficient. In the RC case, the mask layer is very uniform and can be compressed very well using standard binary compressors such as MMR, JBIG and JBIG-2. The foreground layer can contain many edges and continuous tone details, and can be compressed using a lossless data compression under bitmapped image format such as PNG instead of typical continuous tone compressors such as JPEG. In the TI case, text objects and edges are placed in the binary mask layer, thus, can be efficiently encoded using standard binary coders such as MMR, JBIG, JBIG-2, and PWC. The foreground layer would typically contain large uniform patches and, thus, can also be very efficiently compressed even with compressors such as JPEG. Besides, the foreground layer can be sub-sampled without much loss in image quality with edges in the image moved from the continuous tone layer to the binary one. The layer compression engine 106 may further package the compressed layers of the recomposed image in a format, such as TIFF-FX or as an ITU-T data stream for delivery to the image decompression and composition engine 108.

In the example of FIG. 1, the optional image decompression and composition engine 108 retrieves, decompresses, and processes (which might include scaling) each of the compressed layers of the recomposed image, and further reconstructs the original image based on the MRC imaging model used. Note that, unlike the compression operations of the layer compression engine 106, the decompression operations of image decompression and composition engine 108 is not affected by the way the original image is decomposed by the image segmentation engine 102. Still, the image decompression and composition engine 108 and the layer compression engine 106 need agree a priori on the types of compressors and their associated parameters to be used for compressing the one or more layers in order for the image decompression and composition engine 108 to be able to decompress these layers correctly with the corresponding types of decompressors with the same (compression/decompression) approaches and parameters. Once the one or more layers are decompressed, the image decompression and composition engine 108 leverages a mask layer to copy every block in the other layers to its original position in order to reconstruct the original image. In certain circumstances where the mask layer is not represented as a separate layer, the image decompression and composition engine 108 may define a transparent color in one of the layers to implicitly code the mask.

While the system 100 depicted in FIG. 1 is in operation, the image segmentation engine 102 accepts an original compound image and segments the image into one or more image layers based on a multi-layered MRC image model. After decomposing the image into the one or more layers, the image segmentation engine 102 feeds those image layers to the layer recomposition engine 104. The layer recomposition engine 104 then identifies and skips all the "don't care" blocks on each of the original one or more layers, and recompose a set of corresponding new image layers with possible new dimensions, wherein each of the new layers contains non-"don't care" blocks in the corresponding original layer only. These newly composed image layers are then provided to the layer compression engine 106, which chooses a set of compressors each suitable for compressing one of the image layers depending on the layer's content. The layer compression engine 106 then proceeds to compress each of the one or more image layers using its corresponding compressors and in some embodiments, packages the compressed layers of the recomposed image in a format suitable for delivery to the image decompression and composition engine 108. The optional image decompression and composition engine 108 retrieves, decompresses, and processes each of the compressed image layers of the recomposed image, and reconstructs the original image from those decompressed image layers by copying every block to its original position under the MRC imaging model used.

Figure 2:
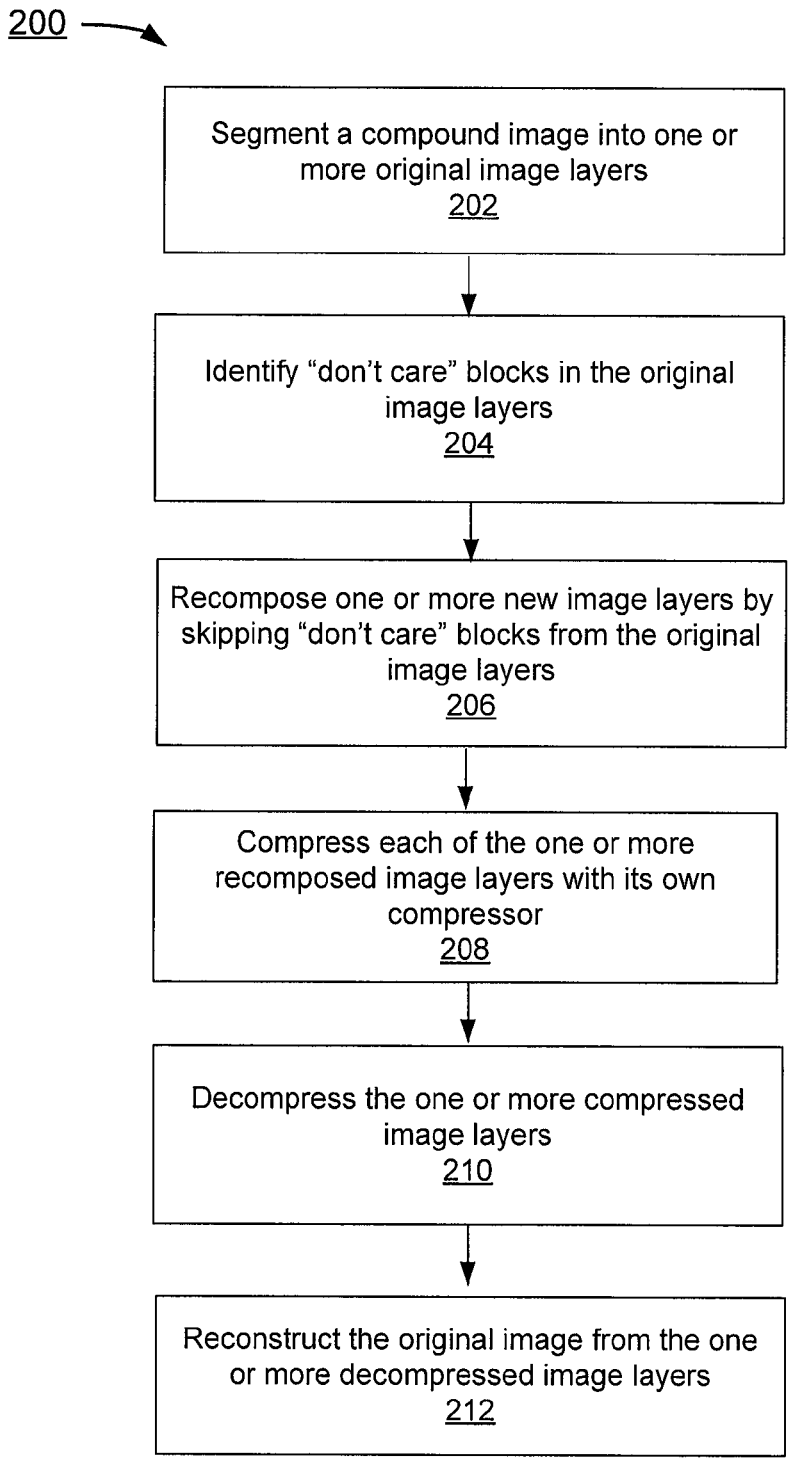
FIG. 2 depicts a flowchart of an example of a process to support block-based recomposition of compound images in accordance with FIG. 1.

FIG. 2 depicts a flowchart of an example of a process to support block-based recomposition of compound images in accordance with FIG. 1. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 2, the flowchart 200 starts at block 202 where a compound image is segmented or decomposed into one or more original image layers. As discussed above, such decomposition can be done under the MRC image model. The flowchart 200 continues to block 204 where "don't care" blocks in the one or more original image layers are identified, wherein each of the "don't care" blocks contains "don't care" pixels only. The flowchart 200 continues to block 206 where one or more new image layers are recomposed from the corresponding original image layers with all of the "don't care" blocks in the layers skipped. During the recomposition, new dimensions may be determined for each of the one or more layers. The flowchart 200 continues to block 208 where each of the one or more recomposed image layers is compressed using its own compressor. The compressor for each image layer can be chosen based on the content of that layer. Optionally, the flowchart 200 continues to block 210 where the one or more compressed image layers are decompressed using decompressors corresponding to the compressors being used. The flowchart 200 ends at block 212 where the original image is reconstructed from the one or more decompressed image layers. Such reconstruction can leverage a mask layer to copy every block in the other layers to its original position.

Figure 3A:
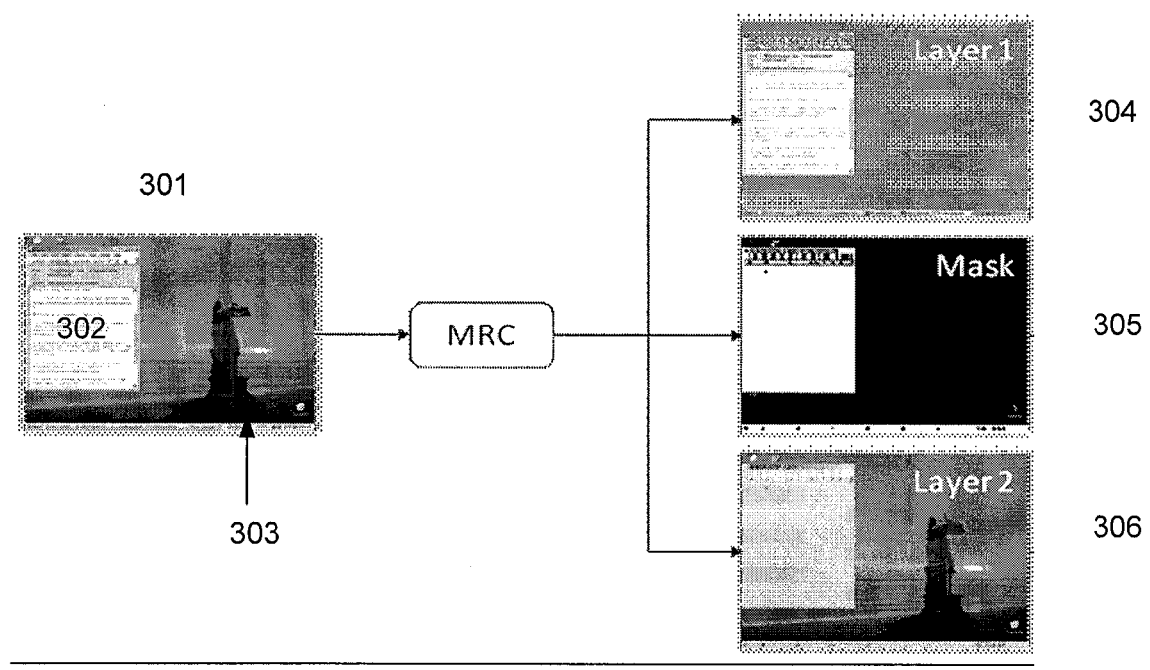
Figure 3B:
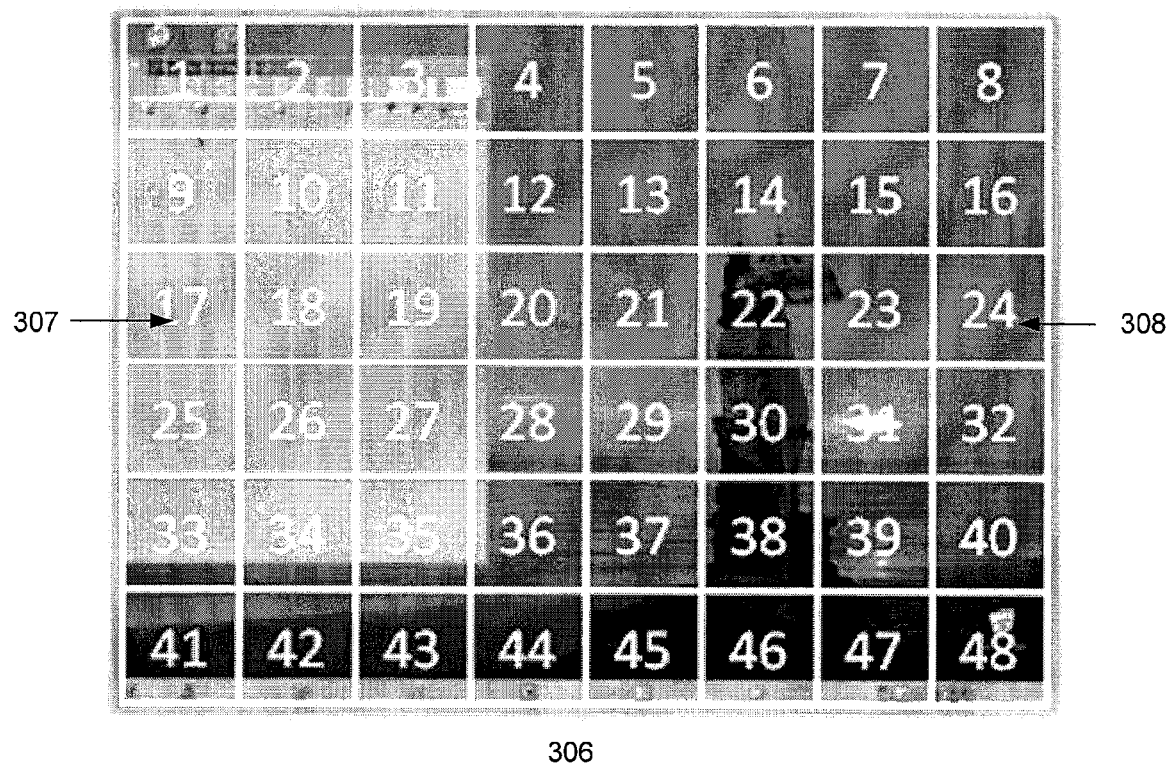
Figure 3E:
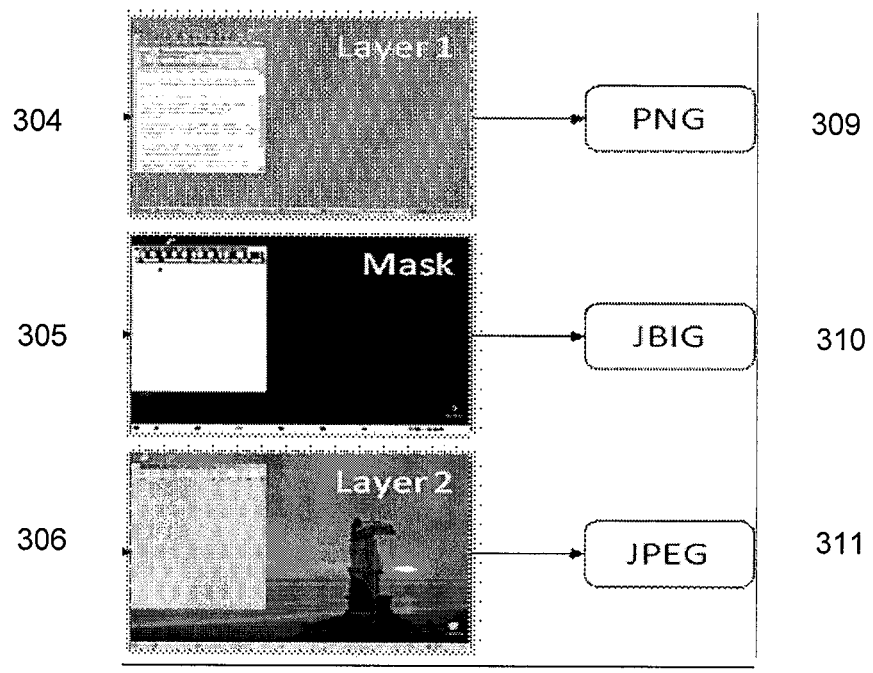

FIGS. 3(*a*)-(*e*) illustrate an example of block-based recomposition of a compound image in accordance with FIG. 1 and FIG. 2. In FIG. 3(*a*), 301 is a compound image containing both textual image portion 302 in the foreground and continuous-tone image portion 303 in the background. Under a typical 3-layer MRC model, the compound image 301 can be decomposed into a foreground Layer1 304, a Mask layer 305, and a background layer 306, under the RC decomposition approached adopted in this case. Here, the foreground Layer1 304 represents texts, the foreground Layer2 306 represents continuous tone pictures, and the Mask layer 305 with large patches indicating the text and graphics portion of the image is used to select the layer to be used for each pixel. Note that both Layer1 304 and Layer2 306 contain "don't care" portion of pixels, which values are to be determined by the other layer, i.e., pixel values of "don't care" portion of Layer1 are to be determined by Layer2, and vise versa. FIG. 3(*b*) illustrates the blocked view of Layer2 306, which measures 8 blocks in the x-dimension and 6 blocks in the y-dimension with a total of 48 blocks. Among these blocks, the blocks labeled 10, 11, 17, 18, 19, 25, 26 and 27 are "don't care" blocks 307, while the rest of the blocks labeled 1-4, 9, 13-28, 33-36 and 41-48 are non-"don't care" blocks 308, since each of them contains at least one non-"don't care" pixel. An abstracted binary view of Layer2 306 with don't care" blocks 307 marked in grey on the left portion of the image and non-"don't care" blocks 308 marked in white is shown in FIG. 3(*c*). Once the "don't care" blocks in Layer2 306 have been identified, they are skipped in the newly recomposed layer for Layer2 306. Assuming that the eight "don't care" blocks 307 do not fit into the maximum width of the compressor being used, the new dimensions for Layer2 306 can then be chosen as 5×8, where 5 and 8 are both products of prime factors of the total number of non-"don't care" blocks on Layer2 306-40. FIG. 3(*d*) illustrates a newly composed image layer for Layer2 306 with only non-"don't care" blocks copied over from top-to-bottom and left-to-right under dimensions of 5×8. Layer1 304 and Mask layer 305 can also be recomposed accordingly. Once recomposed to skip all the "don't care" blocks, Layer1 304, Mask layer 305, and Layer2 306 can each be individually compressed using a PNG compressor 309, a JBIG compressor 310, and a JPEG compressor 311, respectively as shown in FIG. 3(*e*). Here, PNG compressor 309 is chosen to compress the foreground Layer1 304, which contains many sharp edges and other details, the JBIG compressor 310 is chosen to compress the mask layer since it is a very uniform bi-level image, and the JPEG compressor 311 is chosen to compress Layer2 306 since it contains a continuous tone image.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more hosts to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human viewer or other mechanism utilizing the results of the present invention. Such software may include, but is not limited to, device drivers, operating systems, execution environments/containers, and applications.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Particularly, while the concept "component" is used in the embodiments of the systems and methods described above, it will be evident that such concept can be interchangeably used with equivalent concepts such as, class, method, type, interface, module, object model, and other suitable concepts. Embodiments were chosen and described in order to best describe the principles of the invention and its practical application, thereby enabling others skilled in the relevant art to understand the claimed subject matter, the various embodiments and with various modifications that are suited to the particular use contemplated.

What is claimed is:

1. A system, comprising:
   an image segmentation engine running on a host, which in operation, decomposes a compound image into one or more original image layers;
   a layer recomposition engine running on the host, which in operation,
      identifies "don't care" blocks in each of the one or more original image layers;
      recomposes the one or more original image layers into one or more corresponding new image layers having new dimensions by skipping the "don't care" blocks in the one or more original image layers, wherein no value is assigned to each of the skipped "don't care" blocks in the one or more original image layers;
   a layer compression engine running on the host, which in operation, processes and compresses each of the one or more new image layers, wherein each of the one or more new image layers has an associated compressor, the associated compressor being selected based on a content of the new image layer.

2. The system of claim 1, further comprising:
   an image decompression and composition engine running on the host, which in operation,
      retrieves, decompresses, and processes each of the compressed one or more layers;
      reconstructs the original image from the decompressed one or more layers.

3. The system of claim 2, wherein the image decompression and composition engine reconstructs the original image based on the MRC imaging model used.

4. The system of claim 2, wherein the image decompression and composition engine reconstructs the original image by copying every block in the one or more new image layers to its original position in the original image.

5. The system of claim 1, wherein the host is a computing device, a communication device, s storage device, or any electronic device capable of running a software component.

6. The system of claim 1, wherein the image segmentation engine decomposes the compound image based on Mixed Raster Content (MRC) imaging model.

7. The system of claim 6, wherein the MRC imaging model comprises a foreground layer, a background layer, and a mask layer.

8. The system of claim 7, wherein the mask layer is implicitly coded by a transparent color in the foreground layer.

9. The system of claim 6, wherein the MRC imaging model comprises one background layer and one or more pairs of foreground and mask layers.

10. The system of claim 1, wherein the image segmentation engine decomposes and represents the compound image as one, two, three, or more layers, depending on the content of the image.

11. The system of claim 1, wherein the layer recomposition engine selects possible new dimensions for each of the one or more new image layers that hold all non-"don't care" blocks in the corresponding original image layers.

12. The system of claim 1, wherein the layer recomposition engine recomposes each of the one or more new image layers by copying all non-"don't care" blocks in each of the one or more original image layers into the corresponding new image layer.

13. The system of claim 1, wherein the layer recomposition engine eliminates or reduces overhead introduced by "don't care" blocks in the one or more original image layers.

14. The system of claim 1, wherein the compressor is one of JPEG, MMR, JBIG, PWC, and PNG.

15. The system of claim 1, wherein the compressor adopts an associated compression approach and compression parameters.

16. The system of claim 1, wherein the layer compression engine chooses the compressor for each of the new image layer based on type of content of the layer.

17. The system of claim 1, wherein the layer compression engine packages the compressed one or more layers in a format suitable for delivery.

18. A computer-implemented method, comprising:
segmenting, at one or more processors, a compound image into one or more original image layers;
identifying, at the one or more processors, "don't care" blocks in each of the one or more original image layers;
recomposing, at the one or more processors, the one or more original image layers into one or more corresponding new image layers having new dimensions by skipping the "don't care" blocks in the one or more original image layers, wherein no value is assigned to each of the skipped "don't care" blocks in the one or more original image layers;
processing and compressing, at the one or more processors, each of the one or more recomposed image layers, wherein each of the one or more new image layers has an associated compressor, the associated compressor being selected based on a content of the new image layer.

19. The method of claim 18, further comprising: retrieving, decompressing, and processing each of the compressed one or more layers; reconstructing the original image from the decompressed one or more layers.

20. The method of claim 19, further comprising: reconstructing the original image based on the MRC imaging model used.

21. The method of claim 19, further comprising: reconstructing the original image by copying every block in the one or more new image layers to its original position in the original image.

22. The method of claim 18, further comprising: decomposing the compound image based on Mixed Raster Content (MRC) imaging model.

23. The method of claim 18, further comprising: decomposing and representing the compound image as one, two, three, or more layers, depending on the content of the image.

24. The method of claim 18, further comprising: selecting possible new dimensions for each of the one or more new image layers that hold all non-"don't care" blocks in the corresponding original image layers.

25. The method of claim 18, further comprising: recomposing each of the one or more new image layers by copying all non-"don't care" blocks in each of the one or more original image layers into the corresponding new image layer.

26. The method of claim 18, further comprising: eliminating or reducing overhead introduced by "don't care" blocks in the one or more original image layers.

27. The method of claim 18, further comprising: choosing the compressor for each of the new image layer based on type of content of the layer.

28. The method of claim 18, further comprising: packaging the compressed one or more layers in a format suitable for delivery.

29. The method of claim 18, further comprising: choosing the compressor for each of the new image layer based on type of content of the layer.

30. A non-transitory computer-readable storage medium having executable software instructions stored thereon that when executed causes a system to:
segment a compound image into one or more original image layers;
identify "don't care" blocks in each of the one or more original image layers;
recompose the one or more original image layers into one or more corresponding new image layers having new dimensions by skipping the "don't care" blocks in the one or more original image layers, wherein no value is assigned to each of the skipped "don't care" blocks in the one or more original image layers;
compress each of the one or more recomposed image layers, wherein each of the one or more new image layers has an associated compressor, the associated compressor being selected based on a content of the associated new image layer;
retrieve, decompress, and process each of the compressed one or more layers; and
reconstruct the original image from the decompressed one or more layers.

* * * * *